United States Patent
Bello et al.

(10) Patent No.: US 7,440,963 B1
(45) Date of Patent: Oct. 21, 2008

(54) REWRITING A QUERY TO USE A SET OF MATERIALIZED VIEWS AND DATABASE OBJECTS

(75) Inventors: Randall G. Bello, Nashua, NH (US); Bhujanga Panchapagesan, Nashua, NH (US); Tsae-Feng Yu, Nashua, NH (US); John D. Raitto, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 894 days.

(21) Appl. No.: 10/337,714

(22) Filed: Jan. 7, 2003

Related U.S. Application Data (60) Provisional application No. 60/378,405, filed on May 8, 2002.

(51) Int. Cl.
*G06F 17/30* (2006.01)

(52) U.S. Cl. .................. 707/102; 707/3; 707/5

(58) Field of Classification Search ............... 707/1–10, 707/100–104.1, 200–206, 103 R
See application file for complete search history.

(56) References Cited

U.S. PATENT DOCUMENTS

| | | | |
|---|---|---|---|
| 6,618,719 B1 * | 9/2003 | Andrei | 707/2 |
| 6,850,933 B2 * | 2/2005 | Larson et al. | 707/4 |
| 2002/0120598 A1 * | 8/2002 | Shadmon et al. | 707/1 |

OTHER PUBLICATIONS

Nathan Folkert et al., Optimizing refresh of a set of materialized views Aug. 2005, ACM NY NY, pp. 1043-1054.*
Chang-Sup Park, Myoung Ho Kim, Yoon-Joon Lee; Rewriting OLAP Queries Using Materialized Views and Dimension Hierarchies in Data Warehouses; 2001 IEEE; pp. 515-523.

* cited by examiner

*Primary Examiner*—Diane D. Mizrahi
(74) *Attorney, Agent, or Firm*—Hanify & King, P.C.

(57) ABSTRACT

An approach for processing a query in a database system is disclosed. An original query is determined to be partially satisfied by a materialized view. The original query is transformed using a set operation (i.e., union and intersection) on the materialized view and either another materialized view or a base table.

21 Claims, 7 Drawing Sheets

STORE TABLE (400)

| STORE KEY | STORE NAME | CITY | STRENGTH | ... |
|---|---|---|---|---|
| 1 | A1 STORE | BOSTON | 50 | ... |
| 2 | A2 STORE | BOSTON | 79 | ... |
| 3 | B1 STORE | SEATTLE | 100 | ... |
| 4 | B2 STORE | SEATTLE | 60 | ... |
| 5 | C1 STORE | WASH. D.C. | 55 | ... |
| 6 | C2 STORE | WASH. D.C. | 68 | ... |
| 7 | C3 STORE | WASH. D.C. | 67 | ... |

FIG. 4B

FACT TABLE (423)

| STORE KEY | DATE | SALES ($) | ... |
|---|---|---|---|
| 1 | 9-1-2005 | 10,000 | ... |
| 1 | 9-2-2005 | 20,000 | ... |
| 2 | 9-1-2005 | 15,000 | ... |
| 3 | 9-1-2005 | 12,000 | ... |
| 3 | 9-2-2005 | 22,000 | ... |
| 4 | 9-1-2005 | 11,000 | ... |
| 4 | 9-2-2005 | 20,500 | ... |
| 5 | 9-3-2005 | 9,000 | ... |
| 6 | 9-22-2005 | 9,500 | ... |
| 7 | 9-22-2005 | 30,000 | ... |

FIG. 4C

| VIEW MV1 | |
|---|---|
| STORE NAME | SUM SALES ($) |
| A1 STORE | 30,000 |
| A2 STORE | 15,000 |

FIG. 4D

| VIEW MV2 | |
|---|---|
| STORE NAME | SUM SALES ($) |
| A3 STORE | 34,000 |
| A4 STORE | 31,500 |

FIG. 5

REWRITING A QUERY TO USE A SET OF MATERIALIZED VIEWS AND DATABASE OBJECTS

RELATED APPLICATIONS

This application is related to, and claims the benefit of the earlier filing date under 35 U.S.C. § 119(e) of U.S. Provisional Patent Application (Ser. No. 60/378,405), filed May 8, 2002, entitled "Query Rewrite," the entirety of which is incorporated herein by reference.

FIELD OF THE INVENTION

The present invention relates to database systems and more particularly to rewriting queries to access a materialized view and a database object.

BACKGROUND OF THE INVENTION

Relational databases store vast amounts of information in tables, whereby the stored information is retrieved by a user via a database application. In response to an input from the user, the database application submits queries to, for example, a database server. The database server accordingly accesses the tables specified in the query to determine which information within the tables satisfies the query. The information that satisfies the queries is then retrieved by the database server and transmitted to the database application and ultimately to the user. The response time experienced by the user depends, in large part, on the speed by which the queries are processed. Therefore, database designers are continually searching for techniques to reduce processing time of the queries.

One such technique is to utilize a logical table, as in a "materialized view" to answer queries. In general, views may be queried in the manner that tables are queried. Views present data that is extracted or derived from existing tables. A view is defined by metadata referred to as a view definition, which contains mappings to one or more columns in the one or more tables containing the data. Typically, the view definition is in the form of a database query. Columns and tables that are mapped to a view are denoted as base columns and base tables of the view, respectively. The data maintained in the base columns is considered the base data.

The data presented by views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive in terms of time and computing resources.

A "materialized view" is a view for which a copy of the view data is stored separate from the base tables from which the data was originally gathered and derived. The data contained in a materialized view is referred to herein as materialized data. Materialized views eliminate the overhead associated with gathering and deriving the view data every time a query accesses the view. As new data is periodically added to the base tables, the materialized views are updated (i.e., refreshed) to reflect the new base data.

Computer database systems that are used for data warehousing frequently maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information can thus be termed "summary tables." Base tables from summary information is generated are referred to as fact tables.

Figure 4A:
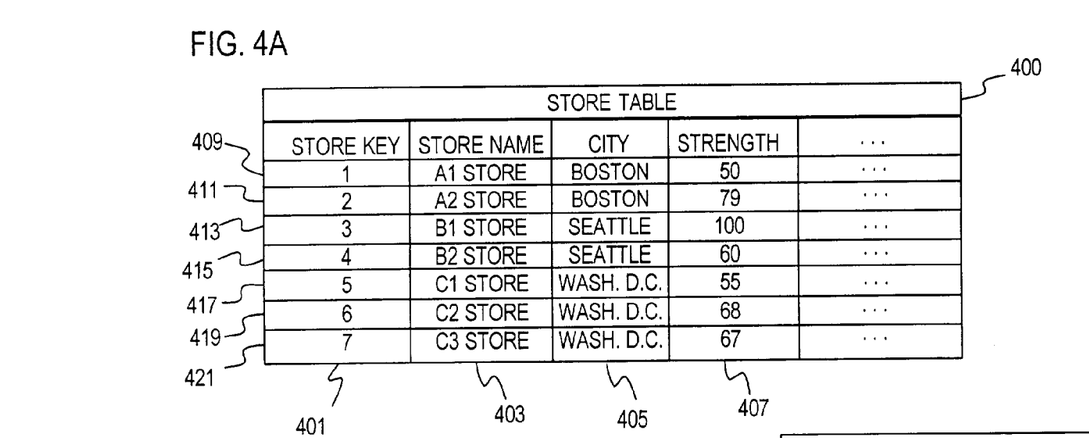
FIGS. 4A-4D are diagrams of exemplary base tables and materialized views.
Figure 4B:
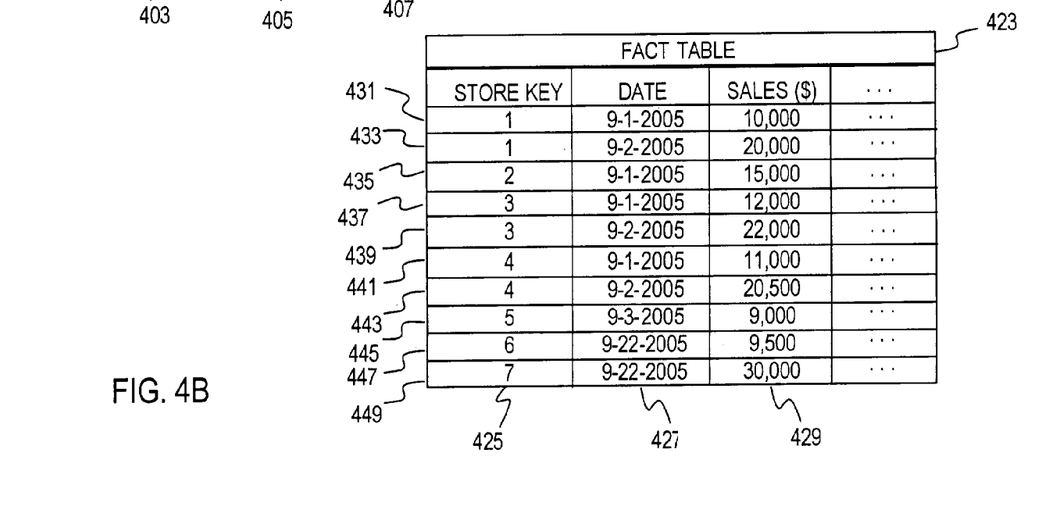

As mentioned, relational databases store information in collections of tables, in which each table is organized into rows and columns. FIGS. 4A and 4B show an exemplary database relating to a retail operation. The database includes a store table 400, which has columns corresponding to the following attributes for stores: a Store Key field 401 for uniquely identifying the stores with a numeric value, a Store Name field 403 for specifying an alphanumeric label, a City field 405 for the name of the city in which the store resides, and a Strength field 407 to indicated the number of employees associated with the particular store. Each row 409-421 provides an entry for a respective store. For example, row 409 is an entry for a store with a Store Key of 1, a Store Name of "A1 Store", City of Boston, and Strength of 50. A fact table 423, as shown in FIG. 4B, holds information in columns for the sales transactions of the stores; these columns, for example, can include a Store Key field 425 (which is identical to that of the Store Key field 401 of the store table 400), a Date field 427 to indicate the date of the sales, and a Sales field 429 to specify the total amount of sales for the store on the particular date. Rows 431-449 capture all the transactions for the corresponding stores.

Figure 4C:
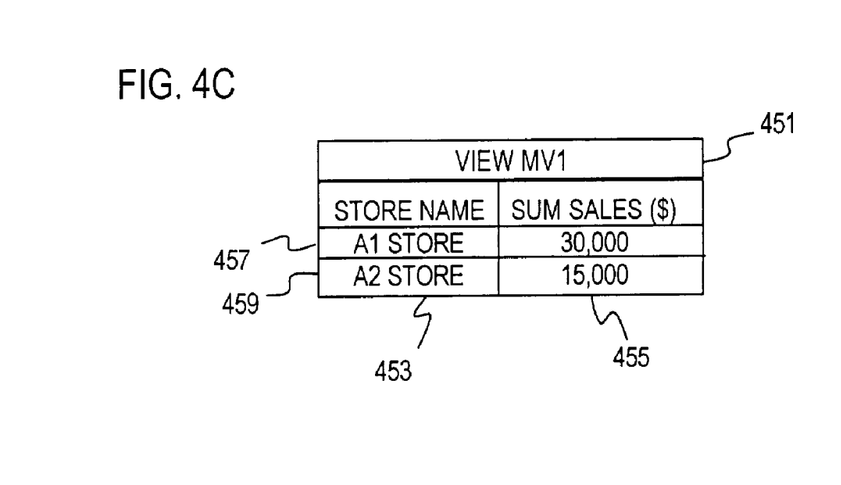

FIG. 4C shows a materialized view 451 representing total sales by store name for Boston:

MV1: CREATE MATERIALIZED VIEW sales_boston
      ENABLE QUERY REWRITE
      AS
      SELECT s.store_name, SUM(f.dollar_sales) as sum_sales
      FROM store s, fact f
      WHERE s.store_key=f.store_key AND s.city = 'Boston'
      GROUP BY s.store_name;

The MV1 451 includes the following columns: Store Name 453 and Sum Sales 455. Row 457 holds information for the A1 Store, which has total sales of $30,000. As seen in row 459, the A2 Store has sales of $15,000.

Although materialized views may exist in a database system, their use may not be fully utilized, resulting in sub-optimal performance. When a database user knows that a particular materialized view, such as MV1, contains the data desired by the user, the user can formulate a query that extracts the desired data directly from that materialized view. For instance, if the user can generate a query requesting information about the sales of each of the stores in Boston, the query can exploit MV1 to improve query processing. However, there are numerous circumstances in which a user will design a query that does not reference a materialized view to retrieve a set of data that can be most efficiently retrieved by accessing the materialized view. For example, the user may not be aware of all of the materialized views available in the database, or may not be sure how a particular materialized view could be used to retrieve the desired information.

Even when the user is aware that materialized views are available that have data desired by the user, the user may prefer to have the server transparently rewrite the query in terms of the materialized views, rather than writing the query to directly reference the materialized views. By allowing the server to rewrite the query, the database administrator may easily add and drop materialized views without affecting the application code that imbeds the user query. For example, if a user query is rewritten by the server to use a particular materialized view MV1, then the application will not break if the database administrator decides to drop MVI. In contrast, if the user query directly references MV1 in the application code, then dropping MV1 will break the application.

Consequently, some database servers include mechanisms for rewriting queries to take advantage of materialized views. The execution of the rewritten query is often considerably improved relative to the original query because the relational objects accessed by the rewritten query are (e.g., the materialized views) much smaller than the objects referenced in the original query (e.g., the base tables), and/or the number of objects used by the rewritten query is less than the number of objects referenced in the original query.

For example, a summary can correspond to a query which joins two tables and performs data aggregation to compute sum-of-sales by city, and stores the materialized result in a table. If a user issues a query Q which requests sum-of-sales by city, then Q can be transparently rewritten to access pre-computed data stored in the summary table. Because of the rewrite, the result for Q can be quickly produced by simply scanning the summary table instead of joining two tables and then aggregating the data.

Conventionally, a query cannot be rewritten if there are no materialized views that contain enough data to answer the original query. As a result, the performance of the query is significantly slower compared to use of a materialized view. The inability to take advantage of materialized views for satisfying a query is made clear by the following example. It is assumed that the database user seeks to obtain sales information of the stores in Boston and Seattle, in which the database application generates the following query:

Q1: SELECT s.store name, SUM(f.dollar_sales) as
  sum_sales
  FROM store s, fact f
  WHERE s.store key=f.store_key
  AND s.city in ('Boston', 'Seattle')
  GROUP BY s.store name;

The above query cannot rewrite against the MV1, because the MV1 does not contain sales information for 'Seattle'. That is, the query cannot be rewritten because the materialized view restriction has to exactly match the query restriction; otherwise no rewrite is possible, as the data is not entirely contained in MV1, even though another materialized view exists for Seattle (i.e., MV2 of FIG. 4D). The MV2 461 has the columns of Store Name 463 and Sum Sales 465, and rows 467 and 469, corresponding to the stores, "A3 Store" and the "A4 Store." Thus, conventionally, the query Q1 cannot be rewritten because the restrictions are not an exact match.

Given the overhead of maintaining materialized views, generating numerous materialized views to anticipate all possible combinations of data that can satisfy all possible queries is impractical. Therefore, there is a need for improving database system performance. There is also a need for enhancing query processing, whereby materialized views can be exploited. There is a further need to support query rewrite.

SUMMARY OF THE INVENTION

These and other needs are addressed by the present invention, in which an approach is provided for rewriting a query to utilize one or more materialized views to satisfy the query. In addition, the query rewrite can employ a base table if the combination of materialized views cannot fully answer the query. According to one embodiment, the range sets of the database objects are unioned and the result is intersected with the range set of the query. In another embodiment, each of the corresponding range sets of the database objects are intersected with the range set of the query; subsequently, the intersections are unioned. Redundant materialized views, if any, are eliminated from the transformed query. The above approach advantageously support query rewrite in the case in which the materialized data can only partially satisfy an original query, thereby extending the use of materialized views.

According to an aspect of the present invention, a method of processing a query in a database system is disclosed. The method includes determining that an original query is partially satisfied by a materialized view. The method also includes transforming the original query into a transformed query using a set operation on the materialized view and a database object. Further, the method includes processing the transformed query.

According to another aspect of the present invention, a database system is provided. The system includes means for determining that an original query is partially satisfied by a materialized view, means for transforming the original query into a transformed query using a set operation on the materialized view and a database object, and means for processing the transformed query.

According to another aspect of the present invention, a method of processing a query in a database system is disclosed. The method includes determining whether a query can be answered by data contained in a combination of a materialized view and a database object that includes at least one of the materialized views and a base table. Additionally, the method includes transforming the received query based on the determining step, which includes computing a common range set corresponding to a union of intersected range sets of the materialized view and the database object with a range set of the query.

According to yet another aspect of the present invention, a database system is disclosed. The system includes a computer-readable medium storing a base table and a plurality of materialized views, wherein one of the plurality of materialized views is derived from the base table. The system also includes a mechanism for determining whether a query can be satisfied by a union of one or more of the plurality of materialized views, and for transforming the query into a transformed query using a set operation on the materialized views, wherein the union includes the base table if the query cannot be answered by the plurality of materialized views.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for transforming a query by generating a union of a materialized view and another database object are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field. The term "database object" refers to either a table or a view, including a materialized view (MV).

Query Transformation

Figure 1:
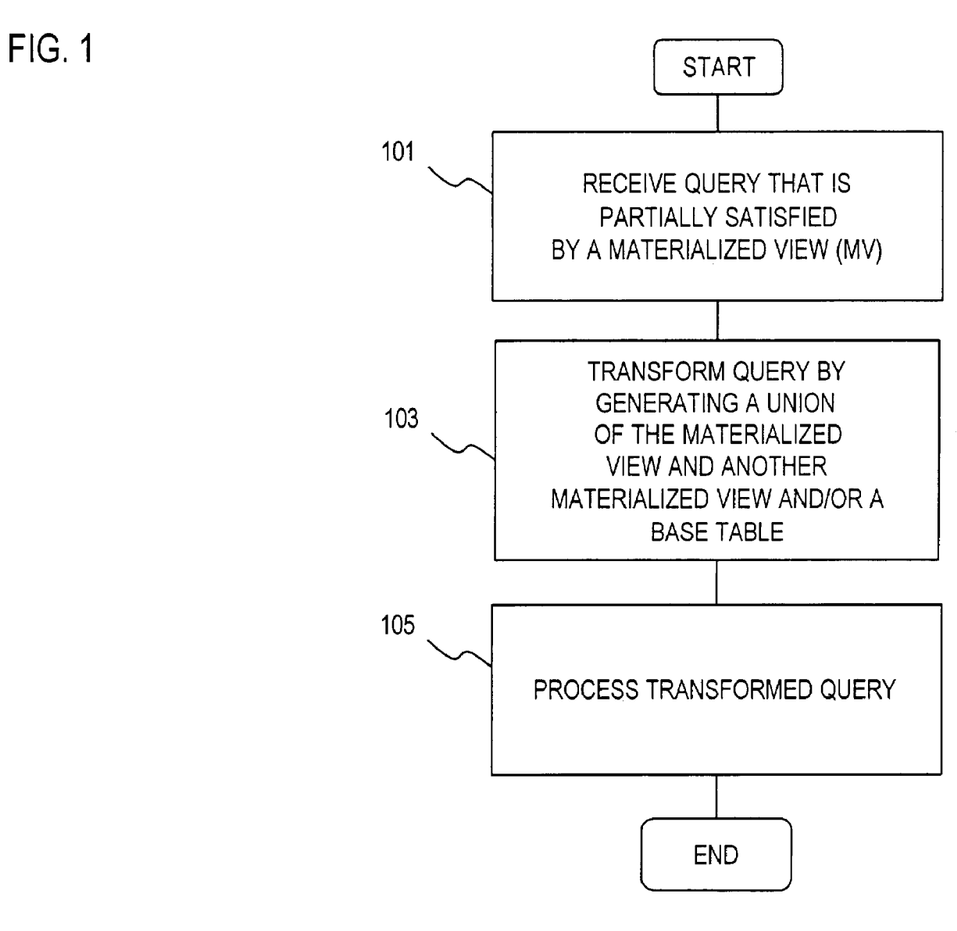
FIG. 1 is a flowchart of an operation for processing a query that can be satisfied by a union of a materialized view and a database object, according to an embodiment of the present invention.

FIG. 1 is a flowchart of an operation for processing a query that can be satisfied by a union of a materialized view and a database object, according to an embodiment of the present invention. The present invention provides a mechanism to examine relevant materialized views to determine if some combination of them as well as base tables can be used to answer the query. The mechanism can determine whether a single materialized view contains sufficient data to permit query rewrite when the materialized view has restrictions; for example, whether the query restriction "s.city in ('Boston'; 'Seattle')" is contained by the materialized view restriction "s.city='Boston'".

Query rewrite is a query optimization technique that transforms a user query written in terms of tables and views, to execute faster by fetching data from materialized views. This technique is transparent to the end user, requiring no intervention or hints in the database application because the database server automatically rewrites any appropriate database application to use the materialized views.

Although examples of query rewrites are illustrated using a SQL (Structured Query Language) SELECT clause, query rewrite can also be applied on INSERT and CREATE TABLE statements that include the SELECT clause. Query rewrite can be used against a wide variety of queries. Under the present approach, the composition of the query does not have to exactly match the definition of the materialized view as this would require that the user have advanced knowledge of the particular queries that would be executed against the data. This is impractical, especially with respect to data warehouses in which one of the main benefits to an organization is to execute a new query arbitrarily. Therefore, the present invention supports query rewrite even if only part of the query can be satisfied by a single materialized view.

As seen in FIG. 1, a query is received, whereby a single materialized view cannot satisfy the query, per step 101. It is noted that if the query can be rewritten using a single materialized view, then this process is not invoked. The received query, as in step 103, is then transformed by generating a union of multiple database objects, which include one or more materialized views and one or more base tables. In step 105, the transformed query is processed. The above approach permits rewriting of a query, such that more than one materialized views are employed.

Figure 2A:
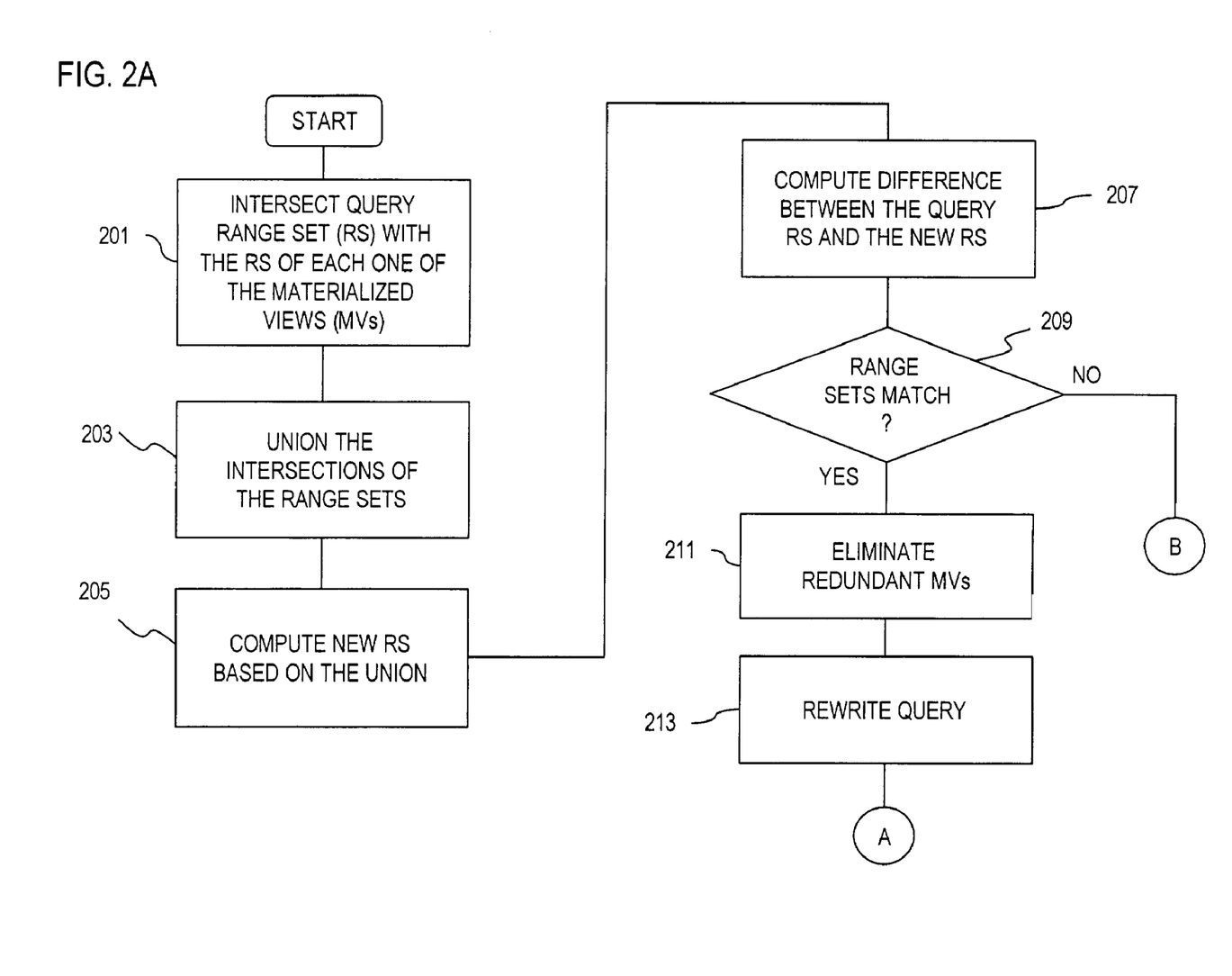
FIGS. 2A and 2B are flowcharts of a query transformation based on intersecting a range set of the query with the range sets of multiple database objects including materialized views, according to an embodiment of the present invention.
Figure 2B:
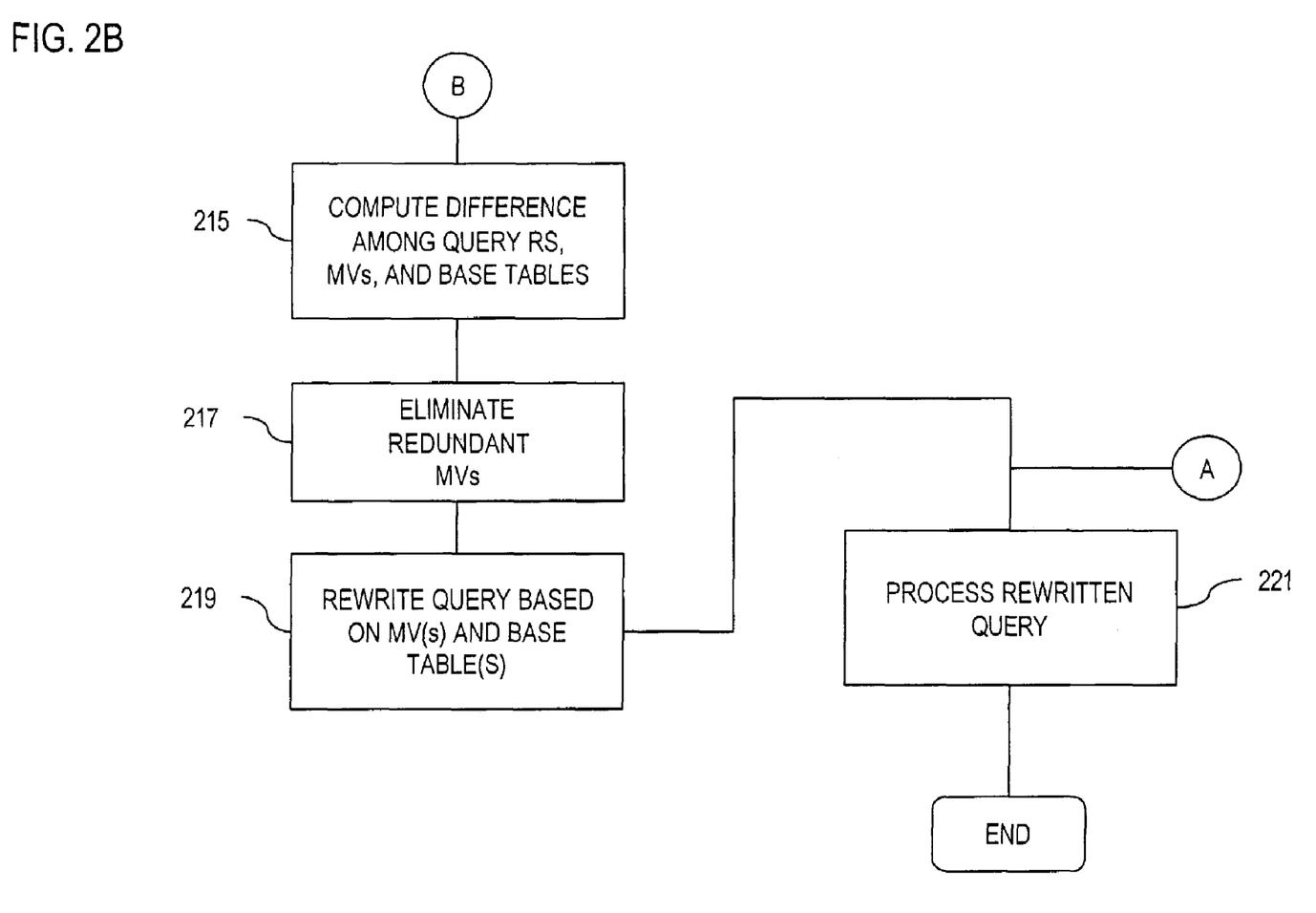
Figure 3:
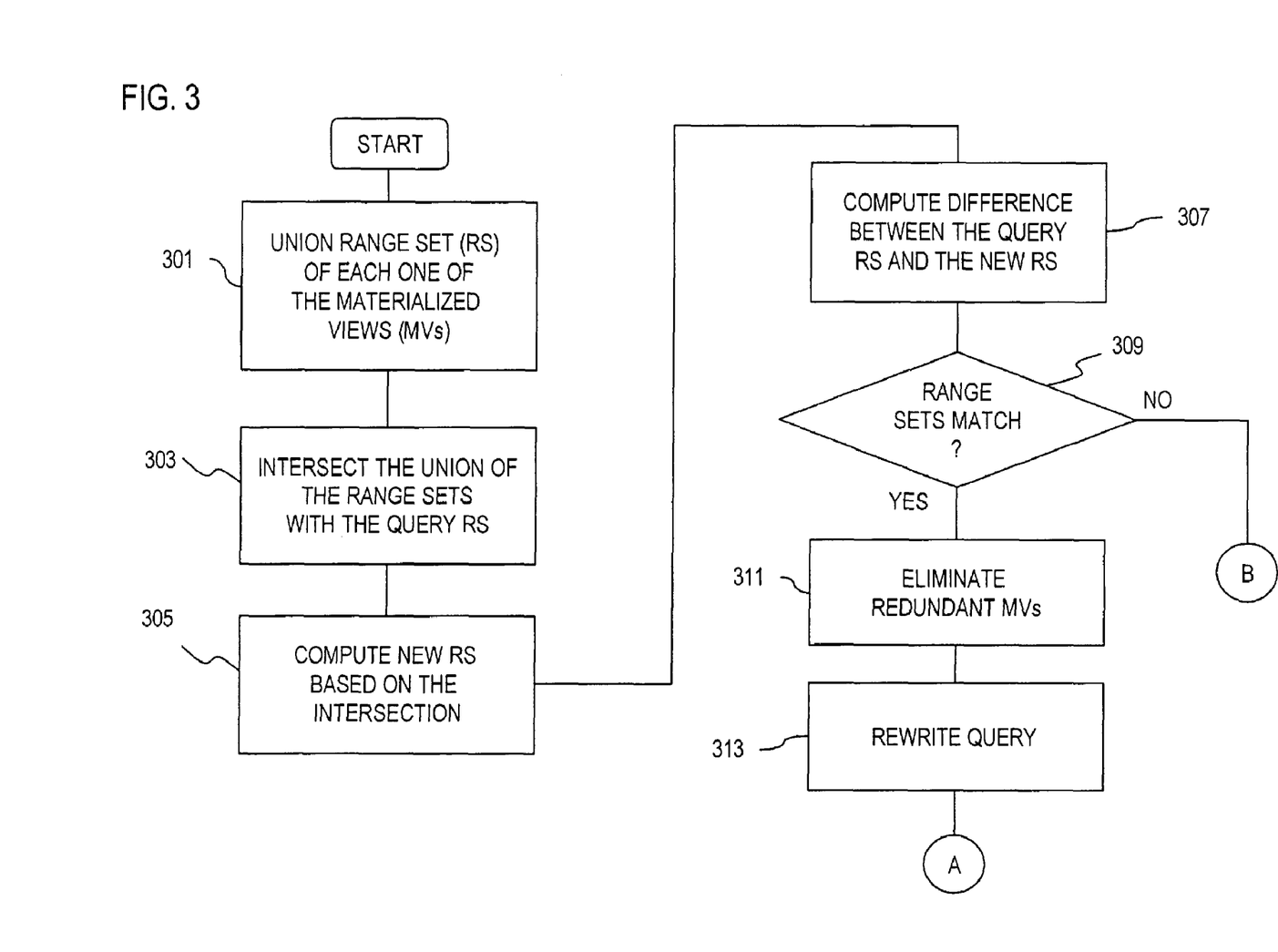
FIG. 3 is a flowchart of a query transformation based on performing a union of range sets of multiple database objects which includes materialized views, and a range set of the query, according to an embodiment of the present invention.
Figure 4D:
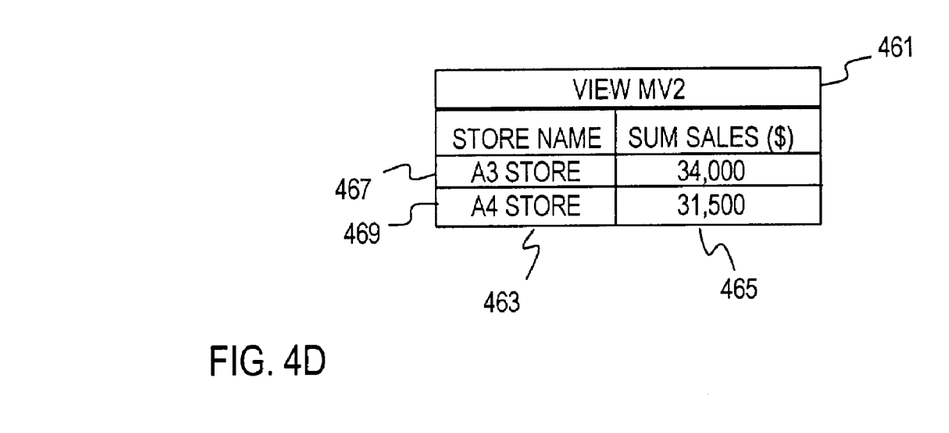

Returning to the previous example, MV2, as shown in FIG. 4D, is created to represent the total sales for 'Seattle':

MV2: CREATE MATERIALIZED VIEW sales_seattle
    Enable Query Rewrite
    AS
    SELECT s.store name, SUM(f.dollar sales) as sum_sales
    FROM store s, fact f
    WHERE s.store_key = f.store_key
        AND s.city ='Seattle'
    GROUP BY s.store_name;

According to an embodiment of the present invention, Q1 can then be rewritten using a UNION of the data in the two materialized views (i.e., MV1 and MV2) as follows:

R1: SELECT v.store name, SUM(v,sum sales)
    FROM ((SELECT m.store_name, m.sum_sales
    FROM sales_boston m )
    UNION ALL
    (SELECT m.store_name, m.sum sales
    FROM sales seattle m)) v
    GROUP BY v.store name;

Under this approach, a query can also be rewritten as a UNION of a materialized view with a query that retrieves the rest of the data from the base tables, as more fully described with respect to FIGS. 2 and 3. This approach advantageously extends the number of rewrites that can be performed by taking advantage of data stored in multiple materialized views. As a result, the user can build smaller more focused materialized views that the query rewrite mechanism can then use.

The query process, as illustrated in steps 101-105, can be conceptually viewed as two phases: (1) an Eligibility Phase—for determining the set of materialized views that can be used to rewrite the query; and (2) a Rewrite Phase—for transforming the query into the rewritten query.

In the Eligibility Phase, containment is computed between an materialized view search conditions and the query search conditions. These search conditions can be arbitrary. The concept of containment is more fully described below. Basically, the containment mechanism detects the "difference" between two sets of search conditions, thereby permitting the determination of whether the search conditions of the query overlap the search conditions of materialized view. If there is no overlap, then the materialized views cannot be solely used for the query rewrite. In general, the search conditions of the materialized views needs to cover some portion of the query search conditions. Further, the difference is used to determine the data that has to be retrieved from base tables, assuming that the set of materialized views cannot fully cover the query data.

The Rewrite Phase modifies the output of the Eligibility Phase and the original query structures into a new set of query structures that reflect the new query with UNION of materialized views and/or base tables. This present invention, according to one embodiment, determines the new search conditions required to satisfy the individual sets of SELECTs that are UNIONed together. These search conditions effectively describe what portion of the data each SELECT has to return. Also it may be required that the set of UNIONs have a SELECT wrapped around them in order to apply a final set of search conditions to filter out any unwanted data. This outer SELECT can re-aggregate the data stemming from the set of UNIONed data.

The notion of a Containment Set Theory (CST) is introduced to define containment semantics for materialized view eligibility, whereby predicates can be treated as sets that can be operated on using set operators such as INTERSECTION, UNION and DIFFERENCE. Accordingly, containment code using well-defined set operations can be implemented. For example, in order to determine if a query's search conditions are contained in a materialized view, the following steps are performed. First, the intersection of the query and materialized view search conditions is performed. Next, the difference is computed between the original query and the intersected results. Lastly, if there is no difference (i.e., an exact match exists), then the query search conditions are contained in the materialized view search conditions.

The present invention, according to one embodiment, supports query rewrite using materialized views that have non-join predicates in the WHERE clause. Conventionally, the only support for this is with exact text match.

Under the data containment construct, both the query and the MV WHERE clauses are placed into canonical form, which is referred to as Modified Disjunctive Normal Form (MDNF). This canonical form allows rewrites of more queries since it eliminates totally arbitrary predicate trees. This is most useful when complex ORs are used. If no ORs are present, the predicate tree remains in tact. The original logical tree is unmodified, however a shadow tree is used to build the query rewrite. In the case of the query, the shadow tree points at the terminals (predicates) of the original predicate tree.

The Disjunctive Normal Form (DNF) describes the state where all ORs are pulled up and all ANDs are pushed down the predicate tree. MDNF is designed to prevent an explosion of the predicate tree. MDNF is DNF with "clumping". Clumping marks sub-trees as 'clumps' that are not to be considered for DNF. The clumped sub-trees remain intact regardless of AND/OR combinations found. One case of clumping is the sub-tree that represents an IN clause. The parser changes the IN list into a series of ORs. Also, there can be ANDs below the OR when multiple columns are being tested; e.g., where (col1,col2,col3) IN ((1,2,3), (4,5,6)). With "clumping" the OR sub-tree is left intact. For example "WHERE model ='mustang' AND (color ='red' OR color='blue'))" would not be modified since the OR is really an IN list.

The predicate tree is modified to MDNF when the ORs across different columns cause the DNF algorithm to be invoked. For example, "WHERE model='mustang' AND (color='red' OR engine='v8')". The tree is changed to "WHERE ((model ='mustang' AND color ='red) OR (model='mustang' AND engine='v8'))".

After computing the MDNF, if the top of the tree is an AND then this case is treated as a disjunct with only one child. The containment algorithm will operate on a disjunct at a time.

IN lists are complex because they represent a complex set of OR and AND trees. Given the following IN clause where "(col1,col2,col3) IN ((1,2,3),(4,5,6))", a parser changes this into a series of disjunctions of conjunctions. Each major set (1,2,3) and (4,5,6) becomes an OR and each element below is separated by AND. Accordingly, it is important that IN list manipulation and comparison be fast and robust.

Therefore, all IN list predicates are converted into a canonical form. Continuing with the above example, a vector of size 2 is allocated, and each element in the vector contains 3 pointers to the values for col1,col2 and col3. Pointer number 1 is used for the column with the lowest table [obj#, column id], pointer 2 for the next lowest and pointer 3 for the highest. The vector can be sorted based on col1's (column with lowest ordinal value) values. In order to compare 2 IN lists, a sorted merge can be performed on the two lists. This approach efficiently compares IN lists between the query and a given materialized view.

As a general rule of containment, all disjuncts of the query tree must match exactly or be contained in at least one disjunct in the materialized view. Within a disjunct, all columns referenced in the materialized view can be referenced in the query; otherwise, the materialized view is overly restrictive for query rewrite. The query can further restrict the search and can have columns not mentioned by the materialized view.

The HAVING clause also can contain search conditions. Consequently, the HAVING clause can be converted to canonical form, as such the HAVING clause can be treated in the same fashion as the WHERE clause.

All complex search conditions (CCON) found in the materialized view must match exactly with a complex search condition in the query. If no match exists, then the materialized view is too restrictive and cannot be used for rewrite.

As regards Partition Based Containment, in order to do Partition Based Rewrite (PBR), the query results should be contained in partitions labeled "FRESH". Accordingly, a stale materialized view can include a stale partitions and fresh partitions. According to one embodiment of the present invention, the partition is by range values. Each partition has a partitioning key that contains one or more columns. Associated with each column in the key is a value such that a predicate is formed: "partition key column LESS THAN partition key value". These predicates describe the high end of the range. The low end of the range is described by the previous partitions range values. Thus, the partition contains all rows that are less than the key value.

For example, the following partitions are considered:
Partition 1: date less than jan 1, 1999
Partition 2: date less than jan 1, 2000
Partition 3: date less than jan 1, 2001
The partition range predicates are as follows:
Partition 1 range is date >=0 and date < jan 1, 1999
Partition 2 range is date >=jan 1, 1999 and date < jan 1, 2000
Partition 3 range is date >=jan 1,2000 and date < jan 1, 2001
By definition, the Partition Key (PARKEY) is composed of columns of the materialized view container table. According to one embodiment of the present invention, the PARKEY is only on the non-measure columns of the materialized view select list.

A predicate tree that represents the range boundaries for each "FRESH" partition is built. Each tree is OR'd together since they represent a distinct set of ranges. It is noted that two contiguous "FRESH" partitions have one set of predicates to represent their contiguous range. Finally, this whole OR tree that represents all partition ranges is AND'd to the materialized view, original WHERE predicate tree. This is performed before the materialized view predicates are converted to MDNF. The materialized view is now restricted in that it can only contain data from a fresh partition. In order to reduce the size of the MDNF tree. The partition range predicates (e.g., the ones below the OR) are treated as "clumps" and are not broke apart during the conversion to disjunctive normal form (DNF).

A degenerate case of partition based containment occurs when the materialized view has no WHERE clause. In this case the partition range predicates become the only predicates.

To aid in the understand of the present invention, a number of terminologies are disclosed, as enumerated in Table 1 below.

TABLE 1

| Term | Definition |
| --- | --- |
| R | Relation with {r1, r2, . . . m} being instances of R. |
| C | Column with {c1, c2 . . . cn} being instances of a column. |
| R.C | Column C of relation R with {r1.c1, r1.c2, r1.cn} being instances of columns from relation r1. |
| E | An Expression with {e1, e2, . . . , en} being instances of E. E represents an expression that can be evaluated at compile time. This is important for containment since a common predicate could be date > todate (' . . . '). The expression effectively evaluates to a constant at compile time. |
| RELOP | A relational operator, relop can be >, >=, =, !=, <, <=, GT, GE, EQ, NE, LT, LE, IN, BETWEEN. |
| P | Predicate with {p1, p2, . . . , pn} being instances of P. P can be of the form <C> <RELOP> <E> |
| V | Constant values with {v1, v2, . . . , vn} being instances V. |
| RE | Range Element with {re1, re2, . . . , ren) being instances of RE. A RE is of the form: <C><low range relop><low range value><high range relop><high range value>. A low range value can be set to MINRANGE. A high range value can be set to MAXRANGE. These values indicate that the actual range value was not specified. So the range may extend to infinity, but it is limited by the physical limits of the data type of the range column. A RE low range is initially set to MINRANGE and its high range is set to MAXRANGE. The low and high range is then changed to the actual values in the range if specified. A predicate p1 (e.g., salary between 10000 and 50000) is represented as a specific range element re1 = [salary, >=, 10000, <=, 50000]. |
| RES | Range Element Set with {res1, res2, . . . , resn} being instances of RES. A RES is a set of associated disjunctive range elements {red, re2 . . . , ren}. That means the range elements in the set are logically OR'd together. |
| RS | Range Set is a set of associated conjunctive range element sets {res1, res2, . . . resn}. Each RES in the set IS logically AND'd together. |
| DRSet | Disjunctive range set -- a set of RS that represents a disjunction between each member of the set. |
| MV | Materialized view with {mv1, mv2, . . . , mvn} being instances of MV. |
| MVSet | A set of MV. |
| MVRSet | Set of MV range sets where {mvrs1, mvrs2, . . . , mvrn} are instances of the set. |
| IqMVn | Represents the intersection of the RS for the query and MVn. |
| IRSet | {IqMV1, IqMV2, . . . , IqMVn} is the set of intersected RS between the query and MV1 through n. IRSet can be sorted descending on MV reduction factor. |

A Range Set represents sets of predicates:

rs={res1{re1, re2, . . . , ren}, res2{ . . . }, . . . resn{ . . . }}.

A Range Element (RE) can represent a single search condition. A single RE can be split into two if, for example, a range predicate were AND'd with a !=predicate. This would cause the range to be broken. A RE can also represent other types of predicates like the IN.

EXAMPLE 1 p1=salary between 10000 and 40000
re1=salary, >=,10000,<=,40000

EXAMPLE 2 p2=model='m3' & manufacturer='bmw'
re2=model, =,m3, =,m3"
re3=manufacturer, =,bmw, =, bmw All set functions take an RS as input and produce an RS. Comparison of two RE requires that the columns match exactly.

Therefore, under this approach, the following set functions are supported: Union, Intersection, and Difference. The Union function computes the union of two range sets. The Intersection function computes the intersection of two range sets. The Difference function computes the difference of range sets.

Boolean functions can be utilized to operate on sets; such functions minimize the use of memory and increase performance. These functions combine set functions to compute the boolean result. These boolean functions include the following: is Equal—for determining whether range sets equal, is Empty for determining whether a range set is empty, and is ContainedIn—for determining whether a RS is contained in another RS. The is ContainedIn function is logically made up of an intersection between the query and materialized view RSs, followed by an is Equal between the original query RS and the one intersected RS. The is ContainedIn function need not generate an intersection to compute containment. Since intersection generates another RS as output, it is better to compute containment without generating a RS as an output. If the intersected RS is needed, then the intersection set function, not the is ContainedIn function, is used.

Next, a discussion of the use of range sets, range element sets, and range elements is provided. In particular, examples to show how a WHERE clause is represented as a range set RS; these are examples of how the RS is built for a given query or materialized view.

EXAMPLE 1

Select empno, salary
from bankcust bc, car_loans cl
where bc.cusl#=cl.cusl#
and bc.salary between 30000 and 40000
and cl-loan_am >40000
Example 1 above contains the following elements:
re1=[bc.salary, >=,30000, <=, 40000]
e2=[cl.loan_amt, >,40000, <=, MAXRANGE]
res1={re1}
res2={re2}
rs1={res1,res2}
The join is not represented since simple predicates are considered.

EXAMPLE 2

Select empno, salary
from bankcust bc, car_loans cl where bc.cust#=cl.cust#
and bc.salary between 30000 and 40000
and bc.salary !=35000
and cl.loan_amt >40000
Example 2 above contains the following elements:
re1=[bc.salary, >=, 30000, <=,40000]
re2=[bc.salary, !=, 35000]
re3=[bc.salary, >=, 30000, <, 35000]
re4=[bc.salary, >35000, <=40000]
re5=[cl.loan_amt, >, 40000, <=, MAXRANGE]
res1={re3, re4}
res2={re5}
rs1={res1, res2}

Range element, re5, has a high range of MAXRANGE, indicating that there is no predicate that sets the high range for column cl.loan_amt; thus, the high range is set to the MAXRANGE for the datatype of loan_amt. It is noted that with the introduction of re2, re1 is broken into re3 and re4; this is the disjoint ranges that the query actually represents. In this example, the query seeks all rows with all salaries between 30000 and 40000, but not the row for salary of 35000. The range is divided into two disjoint ranges. Thus, if there are more than 1 RE associated with a single RES, then each element is a disjunct and treated as a logical OR.

An IN list range element (RE) is represented as a set of the following elements {(C, {v1, v2, . . . ,vn}), . . . , (C,{v1, v2, . . . ,vn})}. This is required to handle IN lists with more than one column.

EXAMPLE 3

Select empno, salary
from bankcust bc, car_loans cl
where bc.cust#=cl.cust#
  and cl.make in ('ford', 'chevy', 'bmw')
  and (cl.type,cl.color) in
    (('sedan','green'),('suv','yellow'))
Example 3 above contains the following elements:
re1=[cl.make, IN, 'ford', 'chevy','bmw']
re2=[cl.type,cl.color, IN, ('sedan', 'green'),('suv', yellow )]
res1={re1}
rs1={res1, res2}

Next, the intersection of two IN lists is described. The following materialized view MV1 is created:
Select empno, salary
from bankcust bc, car_loans cl
where bc.cust#=cl.cust#
and cl.make in ('ford', 'chevy'. 'bmw', 'saab','volvo')
and (cl.type, cl.color) in
(('sedan', 'green'),('sedan','yellow'),('sedan'.
red'), 'suv,'pink')) which contains the following elements
re10=[cl.make, IN, 'ford', chevy', bmw', 'saab', 'volvo')
re20=[cl.type,,cl.color,IN,('sedan . 'green
'),('sedan,'yellow').('sedan', 'red'),('suv', pink')]
res10={re10}
res20={re20}
rs2={res10, res20}
The intersection of MV1 IN lists with the query of example 3 above yields the following:
re30 = = [cl.make.IN, 'ford','chevy', 'bmw']
re40 = [cl.type,,dcolor,IN,('sedan','green')]
res40 = {re30}
res50 = {re40}
rs3 = {res10, res20}

It is noted that the intersection range element re40 does not contain ('suv','yellow') which is in then original query. Thus, MV1 cannot be used to perform the rewrite.

The Union of two IN Lists is as follows. Using the same Example 3, the union produces the following range set RS:
re50= [cl.make,IN, 'ford','chevy','bmw','saab','volvo']
re60 =[cl.type, cl.color.IN,('sedan', '
green'),('sedan','yellow'),('sedan', 'red'),
('suv','pink'),('suv','yellow')]
res70= {re50}
res80 = {re60}
rs3 ={res70, res80}

The present invention, according to one embodiment, provides compression of continuous or overlapping ranges. Although overlapping ranges may not be common, they can occur after a view or subquery flattening. Also, they may occur with check constraints. Continuous ranges, however, occur quite frequently. For example, materialized views for date ranges can be utilized. Assuming one materialized view exists for all months of 1998, and another materialized view for the months of 1999, then the two materialized views can be used to answer a query ranging over the two year period between 1998 and 1999. Example 4 below illustrates the case in which compression of overlapping ranges is performed as each predicate P is added to its RS.

EXAMPLE 4

Select empno, salary
from bankcust bc, car_loans cl where bc.cust#=cl.cast#
and bc.salary between 30000 and 40000 and bc.salary between 35000
and 50000 and cl.loan_amt >40000
and cl.loan_amt >50000
Example 4 above contains the following elements:
re1 = [bc.salary, >=,30000, <=, 40000]
re2 = [bc.salary, >=,35000, <=, 50000]
re3 = [bc.salary, >=,30000, <=, 50000]
re10= [cl.loan_amt, >, 40000, <=, MAXRANGE]
re11= [cl.loan_amt, >, 50000, <=, MAXRANGE]
res1 = {re3}
res2 ={re10}
rs1 ={res1, res2}
The re3 represents the compression of overlapping ranges into a single RE. Since re1 and re2 overlap in their low and high ranges, they can be collapsed into a single RE. The re10 is the only RE that is needed to represent the two predicates for loan_amt since they overlap on the low range.

Although the present invention has particular applicability to multiple materialized views and/or base tables, it is instructive to examine the computation of containment with a single materialized view. That is, the intersection of range sets to compute containment with a single materialized view; e.g., the intersection of the query RS and the materialized view RS.

EXAMPLE 5

Given materialized view MV1:
Select empno, salary
from bankcust bc, car_loans cl where bc.cust#=cl.cust#
and bc.salary between 30000 and 50000 and cl.loan_amt >40000
which contains the following elements:
re1 = [bc.salary, >=,30000, <=, 50000]
re2= [cl.loan_amt, >, 40000, <=, MAXRANGE]* res1 = {re1}
res2={re2}
rs1 ={res1, res2}

Given Query Q:
Select empno, salary
from bankcust bc, car_loans cl where bc.cust#=cl.cust#
and bc.salary between 40000 and 45000 and cl.loan_amt > 50000
which contains the following elements:
re10 =[bc.salary, >=, 40000, <=, 45000]
re11 = [cl.loan_amt, >, 50000, <=, MAXRANGE]
res10 = {r10}
rest11 ={r11}
rs2 = {res10, res11}

The steps in computing containment of a query in a materialized view are as follows. It is noted that the intersection of the range sets includes the intersection of its common components, and the intersection of range element sets requires the intersection of its range elements. First, the intersection of re1 and re 10 are performed, since they both operate on bc.salary:

re20=[bc.salary, >=, 40000, <=, 45000] = intersect(re1, re10)

Next, the re2 and re11 are intersected, as they both operate on cl.loan_amt:

re30=[cl.loan_amt, >, 50000, <=MAXRANG]= intersect (re2, re11)

Thereafter, a new range set is computed:
res30= {re20}
res31={re30}
rs3 ={res30, res31}

Next, rs2 and rs3 are compared for equivalence (i.e., match).
Original Query RS:
re10 = [bc.salary, >=, 40000, <=, 45000]
re11= [cl.loan_amt, >, 50000, <=, MAXRANGE] res10 = {r10}
res11 = {r11}
rs2={res10, res11}
rs3:
re20 = [bc.salary, >=,40000, <=, 45000]
re30= [cl.loan_amt, >, 50000, <=, MAXRANGE] res30 = {re20}
res31 = {re30}
rs3={res30, res31}
if (is Equal(rs2, rs3))
rs2 and rs3 are identical so the query can be rewritten using MV1.

The computation of containment with disjoint (disjunctive) range sets is now described. After putting the WHERE clause in MDNF, the top node may be an OR. In fact, the top several nodes may be ORs. Under each OR is a conjunctive predicate tree. As mentioned above, each such conjunctive tree in the query must match or be contained by some conjunctive tree in the materialized view. In previous discussions, the case without OR was discussed. First the WHERE clause is converted to MDNF. The RS is then computed for each disjunct, resulting in a disjunctive range set DRSet. A DRSet is compared for the query and materialized view.

Each RS in the query DRSet is intersected with an element of the MV's DRSet and the result is checked for equivalence (i.e., is Equal function is used). Every RS in the query must be equivalent with at least one RS in the materialized view; if not, then the materialized view cannot be used to rewrite the query.

Turning now to the scenario of computing the containment of multiple materialized views. Two approaches exist for this computation: (1) union of the materialized views and intersection with the query; and (2) intersection of each of the materialized views with the query, and union of the intersections. The first approach is explained with respect to FIGS. 2A and 2B, while the second approach is described with respect to FIG. 3.

FIGS. 2A and 2B are flowcharts of a query transformation based on intersecting a range set of the query with the range sets of multiple database objects including materialized views, according to an embodiment of the present invention. In this first approach, the search conditions, or range sets, of the materialized views are unioned, then the union is intersected with the query RS. Next, a check for equality with the original query RS is performed. This process is explained with respect to Example 6 below.

EXAMPLE 6

Given materialized view MV1:
Select empno, salary
from bankcust bc, car_loans cl where bc.cust#=cl.cust#
and bc.salary between 10000 and 50000
and cl.loan_amt > 20000
which contains the following elements:
re1 = [bc.salary, >=, 10000, <=, 50000]
re2 =[cl.loan_amt, >, 20000, <=, MAXRANGE]
res1 = {re1}
res2 = {re2}
rs1 = [res1, res2]
Given Materialized View MV2:
Select empno, salary
from bankcust bc, car_loans cl where bc.cust#=cl.cust#
and bc.salary between 50000 and 90000
and cl.loan_amt > 5000
which contains the following elements:
re10 = [bc.salary, >=, 50000, <=, 90000]
re11 =[cl.loan_amt>, 5000, <=, MAXRANGE]
res10={re10}
res11={re11}
rs2 =[res10, res11]
Given query Q:
Select empno, salary
from bankcust bc, car_loans cl where bc.cust#=cl.cust#
and bc.salary between 40000 and 60000
and cl.loan_amt > 50000
which contains the following elements:
re30 =[bc.salary, >=, 40000, <=, 60000]
re31=[cl.loan_amt, >, 50000, <=, MAXRANGE]
res30={re30}
res31={re31}
rs31={res30, res31}

In step 201, the range set of the query is intersected with the range sets of each of the materialized views. In this example, the intersection of the query Q with MV1 is executed, which yields the following:

re40=[bc.salary, >=, 40000, <=, 50000] = intersect(re1, re30)
re41=[cl.loan_amt, >, 50000, <=, MAXRANGE] =intersect(re2, re31)

Additionally, the intersection of the query Q with MV2 yields the following:

re42=[bc.salary, >=, 50000, <=, 60000] = intersect(re10, re30)
re43=[cl.loan_amt, >, 50000, <=, MAXRANGE] =intersect(re11, re31)

Next, the union of the intersections is performed, per step 203:

re50=[bc.salary, >=, 40000, <=, 60000] = union(re40, re42)

re51=[cl.loan_amt, >, 50000, <=, MAXRANGE]= union (re41, re43)

The new range set is then computed, as in step 205, based on the union of the intersections to yield the following:
res60 = {re50}
res61 = {re51}
rs4 = {res60, res61}

In step 207, the difference between the original query and the unions is determined.
Original query range set:
re30 =[bc.salary, >=, 40000, <=, 60000]
re31 =[cl.loan_amt, >, 50000, <=, MAXRANGE]
res30 = {r30}
res31 = {r31}
rs3 = {res30, res31}
Unioned range set:
re50 = [bc.salary, >=, 40000, <=, 60000]
rc51 =[cl.loan_amt, >, 50000, <=, MAXRANGE]
res60= {re50}
res61= {re51}
rs4= {res60, res61}
if (is Equal(rs3, rs4))
rs3 and rs4 are identical so the query can be rewritten using MV1 and MV2.

Next, the difference is examined to determine whether the range sets match (i.e., the query data can be found in the unioned materialized views), per step 209. In the above example, the set of intersected range sets (i.e., IRSet) between the query and materialized views are maintained. There is a possibility that some materialized views from the IRSet may not be necessary, as they may be contained in other materialized views. Therefore, redundant materialized views are dropped, per step 211, from IRSet by comparing every RS in IRSet with every other RS in IRSet. Thereafter, in step 213, the query is rewritten.

As mentioned previously, it is possible that the combined materialized views do not satisfy the query, thereby requiring the use of base tables. To utilize the based tables, the base table predicates are computed using the difference of the range sets of the query, materialized views, and the base table (per step 215). The difference of two RS is defined as follows:
difference(rs1, rs2)—those rows in rs1 that are not in rs2.
According, baseQ =difference(rsQ, rsMV)—the rows found in the query, but not in the MV.

The RS baseQ represents the predicates needed to form a query against the base table to extract just enough data to union with the other materialized views required to answer the query. Redundant materialized views, per step 217, are eliminated. The rewritten query is a union of materialized views and baseQ, as in step 219.

EXAMPLE 7

Compute the difference between MV1 and the query Q.
Given materialized view MV1:
Select empno, salary
from bankcust bc, car_loans cl where bc.cust#=cl.cust#
and bc.salary between 20000 and 30000 which contains the following elements:
re1 =[bc.salary, >=, 20000, <=, 30000]
res1 = {re1}
rs1 = {res1}
Given query Q:
Select empno, salary
from bankcust bc, car_loans cl
where bc.cust#=cl.cust#
and bc.salary between 10000 and 50000
which contains the following elements:
re 10 =[bc.salary, >=, 10000, <=, 50000]
res10 = {re10}
rs2 = {res10}
Compute the difference (baseQ) between the original query and MV1
re30 =[bc.salary, >=, 10000, <=, 20000]
re31 =[bc.salary, >, 30000, <=, 50000]
res30 = {re30, re31}*
re4 ={res30}

The res30 contains two disjuncts re30 and re31 that form the difference. In step 221, the transformed query is processed.

Another example is the intersection of the query RS with the MV RS, in which the difference between the original query and the intersection is computed, which should yield the same baseQ.

The intersected rs1 and rs2 is as follows:
re20 =[bc.salary, >=, 20000, <=, 30000]
res20 = {res20}

The difference between the original query and the intersection is computed, thus giving the baseQ:
res40 = {re40= [bc.salary, >=, 10000, <, 20000
re41 =[bc.salary, >, 30000, <=, 50000]}
re4 ={res40}

The above examples describe computing the difference between two RS; however, it is recognized that the difference can be computed from multiple range sets. The difference represents the predicates needed to get the corresponding (i.e., left over) data from the base tables. Based on this difference, the materialized views that are needed for rewrite and any predicates needed to go against the base tables (if required) are determined.

According to an embodiment of the present invention, the materialized views can be sorted based on the ability to minimize use of redundant materialized data, referred to as "reduction factor". The materialized views are ordered in descending order. The materialized views with the largest reduction factor appear first in the list, in which the materialized views with the greatest reduction factor are first used to rewrite the query. Before including a materialized view in the rewrite a check is made to see if it contributes redundant data. If so then the materialized view is not needed for rewrite since some other materialized view with a higher reduction factor already contains the data.

As indicated above, the combination of a materialized view and another database object (i.e., another materialized view, and base table) can be achieved by intersecting respective materialized views with the query and generating a union of the intersection. Alternatively, the combination can be obtained by performing a union operation on the range sets of the materialized views, then intersecting the resultant range set with that of the query, as described in FIG. 3.

FIG. 3 is a flowchart of a query transformation based on performing a union of range sets of multiple database objects which includes materialized views, and a range set of the query, according to an embodiment of the present invention. Under this approach, each of the range sets of the materialized views are unioned, per step 301. Next, the resultant unioned range set, as in step 303, is intersected with the range set of the query. A new range set is then computed based on the intersection, per step 305.

In step 307, the difference between the query range set and the new range set is computed to determine whether a match exists (step 309). If there is a match, then any redundant materialized views are eliminated, per step 311. Thereafter, the query is rewritten, as in step 313. At this point, the transformed query is processed (per step 221 of FIG. 2B). In the event that the range sets of the materialized views cannot satisfy the query, as determined in step 309, the base tables are utilized, and the query is rewritten and processed, according to steps 215-221 of FIG. 2B.

Therefore, the approach of FIGS. 2 and 3 advantageously improves database system performance by permitting use of multiple materialized views and/or base tables even in the case where the materialized data is across more than one materialized view.

Hardware Overview

Figure 5:
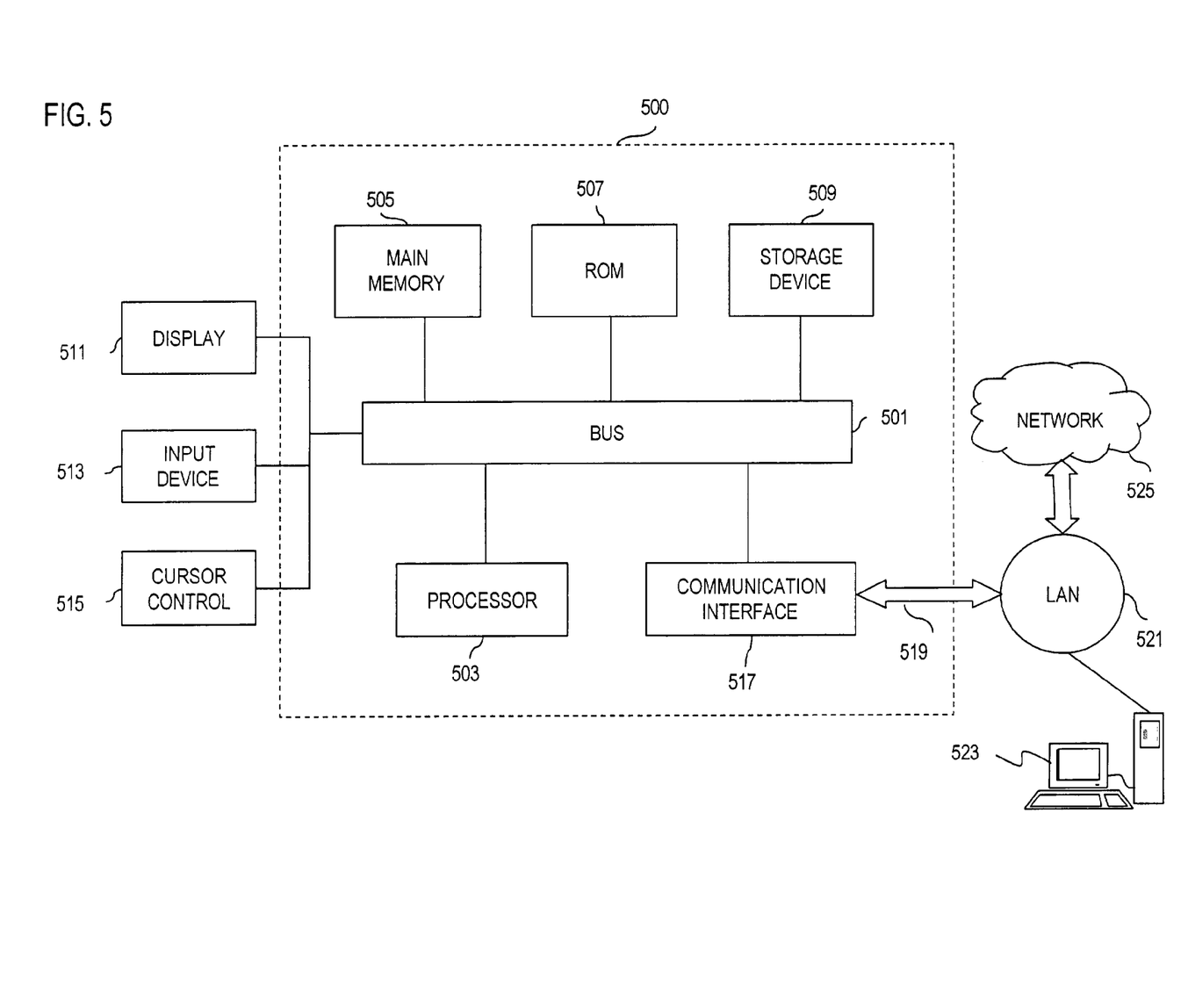
FIG. 5 is a diagram of a computer system that can be used to implement an embodiment of the present invention.

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the query transformations of FIGS. 2 and 3 are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection trough local network 521 to a host computer 523, which has connectivity to a network 525 (e.g. a wide area network (WAN) or the global packet data communication network now commonly referred to as the "Internet") or to data equipment operated by a service provider. The local network 521 and network 525 both use electrical, electromagnetic, or optical signals to convey information and instructions. The signals through the various networks and the signals on network link 519 and through communication interface 517, which communicate digital data with computer system 500, bear the information and instructions.

The computer system 500 can send messages and receive data, including program code, through the network(s), network link 519, and communication interface 517. In the Internet example, a server (not shown) might transmit requested code belonging to an application program for implementing an embodiment of the present invention through the network 525, local network 521 and communication interface 517. The processor 503 may execute the transmitted code while being received and/or store the code in storage device 59, or other non-volatile storage for later execution. In this manner, computer system 500 may obtain application code.

The term "computer-readable medium" as used herein refers to any medium that participates in providing instructions to the processor 505 for execution. Such a medium may take many forms, including but not limited to non-volatile media, volatile media, and transmission media Non-volatile media include, for example, optical or magnetic disks, such as storage device 509. Volatile media include dynamic memory. such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, an approach is presented for rewriting a query to utilize one or more materialized views to satisfy the query. The query rewrite can employ a base table if the combination of materialized views cannot fully answer the query. According to one embodiment, the range sets of the database objects are unioned and the result is intersected with the range set of the query. In another embodiment, each of the corresponding range sets of the database objects are intersected with the range set of the query; thereafter, the intersections are unioned. Redundant materialized views, if any, are eliminated. This approach advantageously provides enhance database system performance by exploiting the processing efficiencies of materialized views.

While the present invention has been described in connection with a number of embodiments and implementations, the present invention is not so limited but covers various obvious modifications and equivalent arrangements, which fall within the purview of the appended claims.

What is claimed is:

1. A computer-implemented method of processing a query in a database system, the method comprising:
   determining that an original query is partially satisfied by a materialized view;
   restricting stale data from the materialized view using a predicate tree that represents range boundaries for one or more fresh partitions resulting in a modified materialized view containing only fresh data;
   transforming the original query into a transformed query using a set operation on the modified materialized view and a database object; and
   processing the transformed query.

2. A computer-implemented method according to claim 1, wherein the database object in the transforming step includes at least one of another materialized view and a base table.

3. A computer-implemented method according to claim 1, further comprising:
   intersecting a range set of the original query with each of corresponding range sets of the modified materialized view and the database object; and
   performing a union of the intersected range sets.

4. A computer-implemented method according to claim 1, further comprising:
   performing a union of range sets corresponding to the modified materialized view and the database object; and
   intersecting the union of the range sets with a range set of the original query.

5. A computer-implemented method according to claim 1, further comprising:
   computing a new range set corresponding to a result of the set operation; and
   determining a difference between the range set of the original query and the new range set.

6. A computer-implemented method according to claim 1, further comprising:
   determining whether one of the materialized views is redundant; and selectively eliminating the redundant materialized view.

7. A computer-implemented method according to claim 1, wherein the determining step is executed using partition based containment.

8. A computer-implemented method according to claim 7, further comprising:
   intersecting a range set of the original query with each of corresponding range sets of the modified materialized view and the database object; and
   performing a union of the intersected range sets.

9. A computer-implemented method according to claim 7, further comprising:
   performing a union of range sets corresponding to the modified materialized view and the database object; and
   intersecting the union of the range sets with a range set of the original query.

10. A computer-implemented method according to claim 7, further comprising:
    computing a new range set corresponding to a result of the set operation; and
    determining a difference between the range set of the original query and the new range set.

11. A computer-implemented method according to claim 7, further comprising:
    determining whether one of the materialized views is redundant; and selectively eliminating the redundant materialized view.

12. A computer-implemented database system comprising:
    computer program code executed on a processor for determining that an original query is partially satisfied by a materialized view;
    computer program code executed on a processor for restricting stale data from the materialized view using a predicate tree that represents range boundaries for one or more fresh partitions resulting in a modified materialized view containing only fresh data;
    computer program code executed on a processor for transforming the original query into a transformed query using a set operation on the modified materialized view and a database object; and
    computer program code executed on a processor for processing the transformed query.

13. A computer-implemented system according to claim 12, wherein the database object includes at least one of another materialized view and a base table.

14. A computer-implemented system according to claim 12, further comprising:
    computer program code executed on a processor for intersecting a range set of the original query with each of corresponding range sets of the modified materialized view and the database object; and
    performing a union of the intersected range sets.

15. A computer-implemented system according to claim 12, further comprising:
    computer program code executed on a processor for performing a union of range sets corresponding to the modified materialized view and the database object; and computer program code executed on a processor for intersecting the union of the range sets with a range set of the original query.

16. A computer-implemented system according to claim 12, further comprising:
computer program code executed on a processor for computing a new range set corresponding to a result of the set operation; and
computer program code executed on a processor for determining a difference between the range set of the original query and the new range set.

17. A computer-implemented system according to claim 12, further comprising:
computer program code executed on a processor for determining whether one of the materialized views is redundant; and
computer program code executed on a processor for selectively eliminating the redundant materialized view.

18. A computer-implemented method of processing a query in a database system, the method comprising:
determining whether a query can be answered by data contained in a combination of a materialized view and a database object that includes at least one of the materialized views and a base table; and
transforming the received query using modified disjunctive normal form, wherein one or more clumped subtrees remain intact, based on the determining step, including, computing a common range set corresponding to a union of intersected range sets of the materialized view and the database object with a range set of the query.

19. A computer-implemented method according to claim 18, wherein the step of transforming the received query using modified disjunctive normal form based on the determining step further comprises the steps of:
marking clumped sub-trees in the received query that represent an IN clause; and
allowing the clumped sub-trees to remain intact in the transforming step.

20. A computer-implemented database system comprising:
a computer-readable storage medium for storing a base table and a plurality of materialized views, wherein one of the plurality of materialized views is derived from the base table; and
computer program code executed on a processor for determining whether a query can be satisfied by a union of one or more of the plurality of materialized views, and for transforming the query using modified disjunctive normal form, wherein one or more clumped subtrees remain intact, into a transformed query using a set operation on the materialized views, wherein the union includes the base table if the query cannot be answered by the plurality of materialized views.

21. A computer-implemented database system according to claim 20, further comprising:
computer program code executed on a processor for marking clumped sub-trees in the query that represent an in clause; and
wherein clumped sub-trees remain intact in the transformed query.

\* \* \* \* \*

UNITED STATES PATENT AND TRADEMARK OFFICE
CERTIFICATE OF CORRECTION

| | | |
|---|---|---|
| PATENT NO. | : 7,440,963 B1 | Page 1 of 1 |
| APPLICATION NO. | : 10/337714 | |
| DATED | : October 21, 2008 | |
| INVENTOR(S) | : Bello et al. | |

It is certified that error appears in the above-identified patent and that said Letters Patent is hereby corrected as shown below:

In column 18, line 23, delete "trough" and insert -- through --, therefor.

In column 18, line 49, after "media" insert -- . --.

In column 18, line 51, delete "memory." and insert -- memory, --, therefor.

Signed and Sealed this

Twenty-seventh Day of April, 2010

David J. Kappos
*Director of the United States Patent and Trademark Office*